United States Patent Office

2,880,130
Patented Mar. 31, 1959

2,880,130

ANTI-INFLAMMATORY STEROID SOLUTIONS

Richard H. Johnson, Kalamazoo, Mich., assignor to The Upjohn Company, Kalamazoo, Mich., a corporation of Michigan No Drawing. Application December 24, 1956
Serial No. 630,013

6 Claims. (Cl. 167—65)

This invention relates to novel compositions of matter and to a novel process for the preparation of the same, and is particularly directed to the preparation of chemically and physically stable, clear aqueous solutions of anti-inflammatory steroid hormones of the 11β,17α,21-trihydroxypregnane-3,20-dione class, such as hydrocortisone, 2-methylenehydrocortisone, Δ$^1$-hydrocortisone, 6-methylhydrocortisone, 6-methyl-Δ$^1$-hydrocortisone, 16-hydroxy-9α-fluorohydrocortisone, 16-hydroxy-9α-fluoro-Δ$^1$-hydrocortisone, and the 21-esters and the 16,21-diesters thereof, which solutions are adapted for topical application to sensitive tissues such as the tissues of the eye, ear, nose, and throat.

Compositions according to the invention having the desired clarity, stability, and adaptability for topical application to sensitive tissues are obtained by dissolving the steroid hormone in a vehicle consisting essentially of water and as a solubilizing agent a nonionic surfactant obtained by condensing sorbitan monooleate and ethylene oxide. The surfactant shall be referred to hereinafter as polyoxyethylene sorbitan monooleate. Using polyoxyethylene sorbitan monooleate, i.e., Tween 80 as the solubilizing agent in a concentration of about two to about 25 percent of the vehicle, it is possible to obtain chemically and physical stable, clear solutions of the steroid hormone in concentrations substantially greater than the maximum solubility of the hormone in water at normal temperature. For example, with a vehicle consisting essentially of one cubic centimeter of water and 100 milligrams of Tween 80, it is possible to obtain clear, stable solutions containing as much as two milligrams of hydrocortisone per cubic centimeter, whereas the maximum solubility of hydrocortisone without the surfactant is 0.28 milligram per cubic centimeter.

The novel solutions of this invention are uniquely characterized by the fact that they can be safely applied to sensitive tissues such as those of the eye, ear, nose, and throat without causing irritation, and by the fact that they contain sufficiently high concentration of dissolved steroid hormone to bring about effective anti-inflammatory action when applied to such tissues. Heretofore, it has not been possible to obtain clear, chemically, and physically stable solutions of anti-inflammatory steroid hormones which are not irritating to sensitive tissues such as those of the eye, ear, nose, and throat and at the same time contain sufficient quantity of the hormone for effective anti-inflammatory action. The novel compositions of the invention, therefore, provide an entirely new type of medicament and make possible an entirely new type of treatment for inflamed tissues of the eye, ear, nose, and throat. While claims have been made of such compositions and such a new type of treatment, it is significant that heretofore no product making possible this new type of treatment has been offered to the medical profession. Thus, while it has been proposed to solubilize hydrocortisone with other types of solubilizing agents, the solutions so formed have not been suitable for ophthalmic purposes.

Different procedures have been found effective for making up solutions according to the invention. According to one procedure, the nonionic surfactant is dissolved in water, and the steroid hormone is stirred in the resulting solution at room temperature until the desired solution is obtained. Thereafter any adjuvants, such as salts, where isotonic solutions are wanted, preservatives, and buffers, are added. Also, other water-soluble drugs may then be added. It is not necessary, however, that the ingredients be added in this sequence. They can be added all at once for example. Advantageously, the nonionic surfactant is dissolved in a portion of the required water, say from about fifty to ninety percent of that required, and the steroid hormone and other soluble ingredients are dissolved in the resulting solution. The balance of the water required in the formulation is then added. This procedure provides for more facile control of the final concentration and is made possible by the fact that when less than the full quantity of water is used, the concentration of the nonionic surfactant is proportionally higher, and the dissolving power of the solution is proportionally greater.

The second procedure, which has been found advantageous, is to heat the solution containing the steroid hormone in order to facilitate the solution of the steroid hormone and/or to stabilize the solution. It has been found that by heating the solution between about forty degrees centigrade and the decomposition point, a more stable solution is obtained. Advantageously the heating can be carried out in an autoclave at a temperature of about 120 degrees centigrade in order to obtain simultaneously both stabilization and sterilization. It has also been found that approximately twice as much steroid hormone can be dissolved if the solution is heated. Thus, two entirely different and distinct effects are obtained by the heating, namely, (1) it is possible thereby to make more concentrated solutions, and (2) it is possible to obtain more stable solutions. It appears, therefore, that some kind of complex is formed between the nonionic surfactant and the steroid hormone which is stabilized by heating. In any event, substantially more stable solutions are obtained on heating over a considerable period. Effective stabilization has been obtained on heating for sixty minutes at seventy to eighty degrees centigrade. Generally speaking satisfactory results can be obtained by heating from fifteen minutes to ninety minutes or more depending on the temperature. A shorter time, however, can sometimes be used and any greater practical time can be used.

The above procedures can be utilized for preparing chemically and physically clear, aqueous solutions of any anti-inflammatory steriod hormone of the 11β,17α,21-trihydroxypregnane-3,20-dione class. This comprises hydrocortisone and the anti-inflammatory analogs thereof. Since the solutions of the invention are intended for application to sensitive tissues such as those of the eye, ear, nose, and throat, it is desirable to avoid using an anti-inflammatory steroid hormone which has high mineral corticoid activity. Such anti-inflammatory steroid hormones, therefore, as hydrocortisone, 2-methylenehydrocortisone, Δ$^1$-hydrocortisone, 6-methylhydrocortisone, 6-methyl-Δ$^1$-hydrocortisone, 16-hydroxy - 9α - fluorohydrocorstisone, and 16-hydroxy-9α-fluoro-Δ$^1$-hydrocortisone are preferred. 2-methylenehydrocortisone can be used advantageously where systemic activity is not desired. Unless otherwise specified, the free alcohols and the therapeutically active esters thereof are included. For example, the 21-esters and the 16,21-diesters of acetic acid, propionic acid, tertiarybutylacetic acid, diethylacetic acid, acrylic acid, mono, di-, and trichloracetic acid, succinic acid, tricarballylic acid, glutaric acid, β,β-dimethyl glutaric acid, aconitic acid, itaconic acid, and like aliphatic monoand poly-carboxylic acids; benzoic acids, phenyl acetic acid, phenoxyacetic acid, furoic acid and like aromatic carboxylic acids; and cyclopentyl carboxylic acid, cyclohexylcarboxylic acid, cyclopentylpropionic acid and like cycloaliphatic carboxylic acids. As the esters ordinarily have a lower solubility than the free alcohols, the less active anti-inflammatory steroid hormones, such as hydrocortisone are advantageously used in the form of the free alcohol. With the more active anti-inflammatory steroid hormones, such as $\Delta^1$-hydrocortisone and particularly with 6-methyl-$\Delta^1$-hydrocortisone, 16-hydroxy-9α-fluorohydrocortisone, 16-hydroxy-9α-fluoro-$\Delta^1$-hydrocortisone, the various 21-esters and 16,21-diesters can be used advantageously because satisfactorily high concentrations of the anti-inflammatory steroid hormone can be obtained within the permissible limits on the amount of the nonionic surface active agent that can be used satisfactorily.

The amount of nonionic surfactant can be varied, but, in view of the purpose for which the compositions are intended, namely, for topical application to sensitive tissues, such as tissues of the eye, ear, nose, and throat, it is desirable that the concentration shall not exceed about 25 percent. Entirely satisfactory solutions are obtained with solutions containing ten percent of these surfactants, with and without the application of heat. Thus, stable solutions containing as much as 0.2 percent (percentage is by weight unless otherwise specified) hydrocortisone have been obtained with ten percent aqueous solutions of Tween 80. Still, lower concentrations of the nonionic surfactant give clear, stable solutions when the heating procedure is followed, as more particularly shown in Example 1. Still lower concentrations of nonionic surfactant can be used, especially where it is not necessary as in the case of the more active anti-inflammatory steroid hormone, such as the 6-methyl-$\Delta^1$-hydrocortisone, to have such a high concentration in the solution. In general, therefore, the concentration of nonionic surfactant in the formulations according to this invention can range from about two to about 25 percent.

Compositions according to the invention, therefore, can have the following general formulations:

| | Percent |
|---|---|
| Anti-inflammatory steroid hormone | 2nx |
| Nonionic surfactant | 2–25 |
| Preservative | Up to 1.5 |
| Solution salts (including buffer salt if any) | Up to 2.0 |
| Lactose | Up to 25 |
| Other drugs | Up to 30 |
| Water | 100 | wherein $x$ represents the solubility of the anti-inflammatory steroid hormone in water at room temperature in percent and $n$ is from one to ten. Lactose is added when it is desired to lyophilize the preparations and functions as a bulking agent. The other drugs used are generally antibacterial agents, water-soluble antibiotics and sulfa drugs for example.

The following examples are illustrative of the processes and products of this invention and are not to be construed as limiting.

EXAMPLE 1

*Sterile aqueous solution of hydrocortisone (0.2%)*

Formulation:

| | | |
|---|---|---|
| Tween 80 | grams | 100 |
| Hydrocortisone | do | 2.1 |
| Sodium citrate | do | 2.0 |
| Sodium chloride | do | 3.7 |
| Chlorobutanol | do | 5.5 |
| Water for injection, q.s. ad. 1 liter. | | |

PROCEDURE A

Dissolve in about 860 cubic centimeters of water for injection (room temperature) in the above order allowing each to dissolve before the next ingredient is added. Add water for injection (room temperature) q.s.-ad one liter. Sterilize by filtration.

PROCEDURE B

Dissolve the Tween 80 in 800 cc. of water for injection by stirring and heating to sixty degrees centigrade. Crush any large lumps in the hydrocortisone, add to the Tween 80 solution and dissolve with stirring and heating at sixty to seventy degrees centigrade for one hour. Cool the solution to 25 degrees centigrade and add the sodium chloride and chlorobutanol. When the chlorobutanol is completely in solution (slow agitation), then dissolve the the sodium citrate and add water for injection to adjust to the final volume of one liter. Sterilize the solution by filtration through a sterile filter pre-washed with five percent sodium bicarbonate solution followed by distilled water.

Procedure B has an advantage over procedure A in that solutions which contain approximately two times the concentration of hydrocortisone can be obtained. The effect of heat on the solubility of hydrocortisone is shown in the following table:

TABLE I

| Concentration of Tween 80 | Approximate Maximum solubility, mg./cc. | |
|---|---|---|
| | Procedure A (without heat) | Procedure B (with heat) |
| 5% | 0.8 | 1.7 |
| 10% | 1.7 | 3.8 |
| 20% | 3.0 | 6.0 |

Procedure B also has the advantage that the stability of the solutions is substantially greater.

EXAMPLE 2

*Sterile aqueous solution, hydrocortisone 0.2 percent neomycin sulfate 0.6 percent*

Using the formulation and procedures of Example 1 with the following formulation:

| | | |
|---|---|---|
| Tween 80 | grams | 100 |
| Hydrocortisone | do | 2 |
| Sodium citrate | do | 3 |
| Sodium chloride | do | 3 |
| Neomycin sulfate | do | 6.4 |
| Chlorobutanol | do | 5.5 |
| Water for injection, q.s. ad. 1 liter. | | | clear, stable solutions containing 0.2 percent hydrocortisone and 0.6 percent neomycin sulfate in a neutral isotonic vehicle were obtained. Procedure A was satisfactory for hydrocortisone lot 1; procedure B for other lots of hydrocortisone.

In place of or in addition to the neomycin sulfate there can be substituted other water-soluble antibiotics such as tetracycline and oxy- and chlor-tetracycline hydrochlorides, sodium penicillin (G, O, V and like forms), polymyxin (B and other forms) sulfate, streptomycin sulfate, erythromycin hydrochloride, bacitracin, gramicidin, and novobiocin, or a combination of two or more of the same. The following examples are illustrative.

EXAMPLE 3

*Sterile aqueous solution, hydrocortisone 0.2 percent, polymyxin B sulfate 12,000 units/cc.*

Using the formulation and procedures of Example 2 except that two grams of polymyxin B sulfate (6,000 units/mg.) was used in place of the neomycin sulfate, there were obtained clear, stable solutions containing two milligrams of hydrocortisone and 12,000 units of polymyxin B sulfate per cubic centimeter.

EXAMPLE 4

*Sterile aqueous solution, hydrocortisone 0.2 percent, neomycin sulfate 0.6 percent, polymyxin B sulfate 12,000 units/cc.*

Using the formulation and procedures of Example 2 except that two grams of polymyxin B sulfate (6,000 units/mg.) was added along with the neomycin sulfate, there was obtained clear, stable solutions containing two milligrams of hydrocortisone, twelve milligrams of neomycin sulfate, and 12,000 units of polymyxin B sulfate per cc.

In place of hydrocortisone in the above formulations, there can be substituted other anti-inflammatory steroid hormones of the $11\beta,17\alpha,21$-trihydroxypregnane-3,20-dione class. Preferably those having low mineral corticoid activity such as hydrocortisone, 2-methylenehydrocortisone, $\Delta^1$-hydrocortisone, 6-methylhydrocortisone and 6-methyl-$\Delta^1$-hydrocortisone, 16-hydroxy-9$\alpha$-fluorohydrocortisone, 16-hydroxy-9$\alpha$-fluoro-$\Delta^1$-hydrocortisone, and the esters thereof as set forth above. The following examples are illustrative.

EXAMPLE 5

*Sterile aqueous solution of $\Delta^1$-hydrocortisone (0.2%)*

Formulation:

| | | |
|---|---|---|
| Tween 80 | grams | 100.0 |
| $\Delta^1$-hydrocortisone | do | 2.1 |
| Sodium chloride | do | 4.7 |
| Chlorobutanol | do | 5.5 |
| Sodium citrate | do | 2.0 |

Water for injection, q.s. ad. 1 liter.

PROCEDURE

Dissolve the Tween 80 in 833 cubic centimeters of water for injection by stirring while heating to approximately 65 degrees centigrade. Add the $\Delta^1$-hydrocortisone and dissolve by stirring and heating at seventy to eighty degrees centigrade for one hour. Cool the solution to room temperature. Then dissolve the sodium chloride and chlorobutanol making sure the solution is complete. Then dissolve the sodium citrate and adjust volume with water for injection to one liter. Pass the solution through a sterile filter, pre-washed with five percent sodium bicarbonate solution and water for injection.

EXAMPLE 6

*Sterile aqueous solution of $\Delta^1$-hydrocortisone (0.1%)*

Formulation:

| | | |
|---|---|---|
| Tween 80 | grams | 100 |
| Delta hydrocortisone | do | 1.05 |
| Sodium chloride | do | 3.7 |
| Chlorobutanol | do | 5.5 |
| Sodium citrate | do | 2.0 |

Water for injection, q.s. ad. 1 liter.

PROCEDURE

Dissolve the Tween 80 in 400 cubic centimeters of water for injection. Then add and dissolve the $\Delta^1$-hydrocortisone. Add 458 cubic centimeters of water for injection and dissolve the sodium chloride and chlorobutanol. Finally dissolve the sodium citrate and adjust to one liter with water for injection. Pass the solution through a sterile filter, pre-washed with five percent sodium bicarbonate solution and water.

With the lower concentration of $\Delta^1$-hydrocortisone it is not necessary to use heat to obtain a clear, stable solution.

EXAMPLE 7

*Sterile aqueous solution containing $\Delta^1$-hydrocortisone (0.1%) and neomycin sulfate (0.6%) and bacitracin (500 u/cc.) and polymyxin (5,000 u/cc.) and a soluble powder for preparing the same*

Using the procedure of Example 6 with the following formulations:

| | | |
|---|---|---|
| Tween 80 | grams | 50 |
| $\Delta^1$-hydrocortisone | do | 1.05 |
| Neomycin sulfate | do | 6.5 |
| Polymyxin B sulfate (10,000 units/mg.) | do | 0.6 |
| Bacitracin (50 units/mg.) | do | 12 |
| Lactose | do | 250 |
| Sodium citrate | do | 3.0 |

Water for injection, q.s. ad 1 liter.

there are obtained (a) a clear, stable solution containing one milligram of $\Delta^1$-hydrocortisone, 6.5 milligrams of neomycin, 600 units of bacitracin and 6,000 units of polymyxin B sulfate per cubic centimeter and (b) a water-soluble product from which said solution can be reconstituted. This water-soluble product is obtained by apportioning the solution in five cubic centimeter portions into vials and lyophilizing the solution in the vials. Each vial then contains 250 milligrams Tween 80, 5.25 milligrams $\Delta^1$-hydrocortisone, 32.5 milligrams neomycin sulfate, fifteen milligrams sodium citrate, 1250 milligrams of lactose, 30,000 units of polymyxin B sulfate and 3,000 units of bacitracin.

In the lyophilized preparations the amount of nonionic surfactant should not exceed about five percent, since too much surfactant results in a nonredispersible cake.

EXAMPLE 8

*Sterile aqueous solution containing $\Delta^1$-hydrocortisone (0.1%) and neomycin sulfate (0.6%)*

Using the procedure of Example 6, with the following formulation:

| | | |
|---|---|---|
| Tween 80 | grams | 100 |
| $\Delta^1$-hydrocortisone | do | 1.05 |
| Neomycin sulfate | do | 6.5 |
| Sodium chloride | do | 2.0 |
| Sodium citrate | do | 4.5 |
| Chlorobutanol | do | 5.5 |

Water for injection, q.s. ad 1 liter.

there is obtained a clear, stable, neutral solution containing one milligram of $\Delta^1$-hydrocortisone and 6.5 milligrams of neomycin sulfate per cubic centimeter.

EXAMPLE 9

*Sterile aqueous solution containing $\Delta^1$-hydrocortisone (0.1%) and bacitracin and a soluble powder for preparing the same*

Using the formulation and procedures of Example 7 except that twenty grams of bacitracin (fifty units per mg.) is used in place of the three antibiotics, there are obtained (a) a clear, neutral solution (limited stability due to the bacitracin) containing 1 mg. of $\Delta^1$-hydrocortisone and 1,000 units of bacitracin per cubic centimeter in an isotonic vehicle and (b) soluble powder from which said solution can be reconstituted.

Using the same formulations, except for the antibiotic, and the same procedure, soluble reconstitutable powders can be prepared with other antibiotics, such as sodium penicillin and polymyxin B sulfate, which have limited stability in aqueous solutions.

In place of the chlorobutanol, other preservatives can be used to prevent bacteria and fungal contamination of the solutions. Other such suitable preservatives include benzyl alcohol, myristyl gamma picolinium chloride, phenyl mercuric nitrate, benzalkonium chloride, phenylethyl alcohol, p-chlorophenyl-$\alpha$-glycerol ether, methyl and propyl parabens, thimerosal. Also the buffer salt (sodium citrate) can be omitted provided it is replaced with sufficient other salt to maintain isotonicity. The solutions can contain also other water-soluble drugs such as phenylephrine hydrochloride, sodium sulfacetamide, chlorprophenpyridamine gluconate, thonzylamine hydrochloride, sodium propionate, and the like.

The hydrocortisone and $\Delta^1$-hydrocortisone in the above examples can be replaced by 6-methyl-hydrocortisone (6- methyl-11β,17α,21-trihydroxy-4-pregnene-3,20-dione), 6-methyl-Δ¹-hydrocortisone (6 - methyl - 11β,17α,21 - trihydroxy-1,4-pregnadiene-3,20-dione), 16-hydroxy-9α-fluorohydrocortisone (11β,16α,17α,21-tetrahydroxy-9α-fluoro-4-pregnene-3,20-dione), and 16-hydroxy-9α-fluoro-Δ¹-hydrocortisone (11β,16α,17α,21 - tetrahydroxy - 9α - fluoro-1,4-pregnadiene-3,20-dione), and the 21 esters thereof to give more potent formulations because of the higher anti-inflammatory activity of these steroids. Alternatively the amount of these steroids can be reduced to give formulations of equivalent potency. 2-methylene-hydrocortisone (2 - methylene-11β,17α,21-trihydroxy-4-pregene-3,20-dione) can be used where an anti-inflammatory steroid hormone having topical but little systemic activity is desired.

It is to be understood that the invention is not to be limited to the exact details of operation or exact compounds shown and described herein, as obvious modifications and equivalents will be apparent to one skilled in the art, and the invention is therefore to be limited only by the scope of the appended claims.

We claim:

1. A composition of matter comprising an aqueous solution of an anti-inflammatory steroid hormone of the 11β,17α,21-trihydroxypregnane-3,20-dione class and as a nonionic surfactant solubilizing agent, polyoxyethylene sorbitan monooleate, said composition having the following formula:

| | Percent |
|---|---|
| Anti-inflammatory steroid hormone | $2nx$ |
| Nonionic surfactant | 2–25 |
| Preservative | Up to 1.5 |
| Soluble salts (including buffer salt if any) | Up to 2.0 |
| Lactose | Up to 25 |
| Other drugs | Up to 30 |
| Water, q.s. ad. 100 percent. | | wherein $x$ represents the solubility of the anti-inflammatory steroid hormone in water at room temperature in percent and $n$ is from one to ten, said anti-inflammatory steroid hormone being selected from the class consisting of hydrocortisone, 2-methylene-hydrocortisone, Δ¹-hydrocortisone, 6-methylhydrocortisone, 6-methyl-Δ¹-hydrocortisone, 16-hydroxy-9α-fluorohydrocortisone, 16-hydroxy-9α-fluoro-Δ¹-hydrocortisone, and the substantially water-insoluble 21-esters and the substantially water-insoluble 16,21-diesters thereof.

2. A composition of matter comprising an aqueous solution containing two to 25 percent polyoxyethylene sorbitan monooleate and 0.056 to 0.56 percent hydrocortisone.

3. The process which comprises dissolving a polyoxyethylene sorbitan monooleate in water and then dissolving in the solution obtained a member selected from the group of steroid hormones consisting of hydrocortisone, 2-methylene-hydrocortisone, Δ¹-hydrocortisone, 6-methyl-hydrocortisone, 6-methyl-Δ¹-hydrocortisone, 16-hydroxy-9α-fluorohydrocortisone, 16-hydroxy-9α-fluoro-Δ¹-hydrocortisone, and the substantially water-insoluble 21-esters and the substantially water-insoluble 16,21-diesters thereof, the amount of polyoxyethylene sorbitan monooleate being in the range of from about 2 to about 25% and being sufficient to increase the solubility of the steroid hormone substantially above that which can be dissolved in water alone, the amount of steroid hormone thus dissolved being greater than the amount which can be dissolved in water alone.

4. The process of claim 3 in which the solution of the steroid hormone is heated to at least about 40° C. for at least about 15 minutes.

5. The process for preparing an aqueous solution of an anti-inflammatory steroid hormone selected from the group consisting of hydrocortisone, 2-methylene-hydrocortisone, Δ¹-hydrocortisone, 6-methyl-hydrocortisone, 6-methyl-Δ¹-hydrocortisone, 16-hydroxy-9α-fluorohydrocortisone, 16-hydroxy-9α-fluoro-Δ¹hydrocortisone, and the substantially water-insoluble 21-esters and the substantially water-insoluble 16,21-diesters thereof which comprises dissolving polyoxyethylene sorbitan monooleate in about 50 to 90% of the required water, dissolving the anti-inflammatory steroid hormone in the solution thus prepared and diluting the obtained solution with the remainder of the required water, the amount of polyoxyethylene sorbitan monooleate being in the range of from about 2 to about 25% and being sufficient to increase the solubility of the steroid hormone substantially above that which can be dissolved in water alone and its total amount of water being insufficient in the absence of said polyoxyethylene sorbitan monooleate to dissolve all of the said anti-inflammatory steroid hormone.

6. The process of claim 5 in which the solution of the anti-inflammatory steroid hormone is heated to at least 40° C. for at least about 15 minutes.

References Cited in the file of this patent

UNITED STATES PATENTS

| 2,497,509 | Miescher | Feb. 14, 1950 |
| 2,653,955 | Rogers | Sept. 29, 1953 |
| 2,779,707 | Jacobson | Jan. 29, 1957 |
| 2,779,775 | Sarett | Jan. 29, 1957 |

OTHER REFERENCES

Ekwall: Chemical Abstracts, 49:7754F. (Copy in POSL.)

Ekwall: Acta Chemica Scandinavica 5:2, pp. 1383–1387, 1951.

Ekwall: Acta Endocrinol, 4, pp. 179–191, 1950.

Dulin: P.S.E.B.M., 90:1, pp. 115–117, October 1955.

"Spans and Tweens," Atlas Powder Co., 1942, 17 page pamphlet.